Patented Oct. 1, 1946

2,408,535

UNITED STATES PATENT OFFICE 2,408,535

THROMBOPLASTIN PRODUCT AND PROCESS FOR PREPARATION OF SAME

Harry P. Smith, Iowa City, Iowa, assignor to Parke, Davis & Company, Detroit, Mich., a corporation of Michigan No Drawing. Original application April 29, 1940, Serial No. 332,397. Divided and this application June 22, 1942, Serial No. 448,033

5 Claims. (Cl. 167—74)

The invention relates to the preparation of antithrombin-free thromboplastin which is an intermediate product useful in the preparation of highly active thrombin preparations capable of effective use in clotting blood.

This application is a division of my Patent No. 2,398,077, issued April 9, 1946, in which the thrombin preparations and processes for obtaining the same are claimed.

It is known that extracts of tissues, such as saline extracts of brain tissue and other body tissues, e. g. those from the lung and kidneys, contain a substance or activity which has been designated as thromboplastin. The thromboplastin preparations previously obtained have not been of sufficient purity for all purposes, because they contain a certain amount of substances, termed "antithrombins," which have the property of destroying thrombin. Thus, the previous thromboplastin preparations have proved to be unsatisfactory for use in obtaining stable thrombin preparations.

Another disadvantage of previously known thromboplastin preparations is that they will not completely dissolve in saline, for example, physiological saline (0.85% NaCl). This undesirable characteristic of incomplete solubility in saline is the more likely to be present, the more one tries to purify the throboplastin preparation and eliminate antithrombins from the same. The numerous treatments, especially where these could not be properly controlled, always tended to denature the product and render considerable amounts of it insoluble in saline. For this reason, it has not been possible heretofore to prepare a thromboplastin which is not only completely free from antithrombins, but which is also completely soluble in saline.

I have found that salt precipitation of a tissue extract containing thromboplastin, when carried out at an alkaline pH, preferably pH about 9, with a plurality of such salt precipitations not to exceed about 5 times, gives a product which is not only free from antithrombins but which is completely soluble in dilute sodium chloride solution. Such a product is extremely valuable, since it can be used to prepare stable thrombin preparations which, prior to the present invention, could not be obtained by the use of the known thromboplastin extracts.

Example.—Preparation of thromboplastin 100 grams of fresh ground beef lung are mixed with 100 cc. of saline and allowed to stand with occasional stirring, for 48 hours at 5° C. The mixture is centrifugalized and the fluid obtained is diluted with an equal volume of saline. Any prothrombin present is removed by adding one-sixth volume of magnesium hydroxide suspension followed by centrifugalization.

The magnesium hydroxide suspension can be made by adding 25 cc. of concentrated ammonium hydroxide to 100 cc. of 20% magnesium chloride, decanting and washing the precipitate several times with water, centrifugalizing and suspending the packed precipitate in 30 cc. of saline.

After centrifuging off the magnesium hydroxide with its adsorbed prothrombin and other impurities, 100 cc. of ammonium sulfate solution saturated at 5° C. are added to each 100 cc. of the clear solution remaining. A precipitate of thromboplastin forms, is centrifuged off, and the precipitate dissolved in 100 cc. of saline. If desired, the precipitation can be repeated and the final precipitate dissolved in 15 cc. of saline and dialyzed against saline until free of ammonium sulfate. The saline solution of thromboplastin thus obtained is free from antithrombins and can be used in preparing thrombin as described in my Patent No. 2,398,077.

The saline thromboplastin solution can be evaporated to dryness, if desired, in a vacuum. The thromboplastin is completely soluble in saline. It will be noted that the magnesium hydroxide suspension used in preparing the thromboplastin of this example leaves the solution of thromboplastin at an alkaline pH (about pH 9 to pH 9.5) during the step of precipitation with ammonium sulfate. The thromboplastin obtained by this example is free from antithrombins and this can be demonstrated by mixing the product with measured amounts of thrombin and testing for destruction of thrombin, by any antithrombins, after a period of 10 hours.

Instead of evaporating the saline solution of thromboplastin of this example to dryness, it can first be dialyzed against pure water and then dried to give a purified, stable, antithrombin-free product which is completely soluble in saline.

As previously stated, the new antithrombin-free thromboplastin is of particular utility in the manufacture of highly active thrombin preparations as set forth in my application, Serial No. 332,397.

What I claim as my invention is:

1. Process for the preparation of antithrombin-free thromboplastin completely soluble in saline which comprises first removing part of impurities with magnesium hydroxide and then adding a protein-precipitating salt to precipitate a tissue extract containing thromboplastin at an alkaline pH for a plurality of times not to exceed about five times.

2. Process for the preparation of antithrombin-free thromboplastin completely soluble in physiological saline solution which comprises first removing part of the impurities from an animal tissue extract containing thromboplastin by adsorption of said impurities on magnesium hydroxide, separating the magnesium hydroxide and adsorbed impurities from the remaining solution of unadsorbed thromboplastin and eliminating additional impurities by adding a protein-precipitating salt to the partially purified thromboplastin solution in thromboplastin precipitating proportions at an alkaline pH, separating the resulting precipitate of thromboplastin from the solution containing unprecipitated impurities, redissolving the thromboplastin precipitate in saline solution and repeating the precipitation at alkaline pH and separation from unprecipitated impurities a number of times not to exceed about four, and thereafter dialyzing a solution of the purified thromboplastin against physiological saline solution.

3. Process for the preparation of antithrombin-free thromboplastin completely soluble in physiological saline solution which comprises first removing part of the impurities from an animal tissue extract containing thromboplastin by adsorption of said impurities on magnesium hydroxide, separating the magnesium hydroxide and adsorbed impurities from the remaining solution of unadsorbed thromboplastin and eliminating additional impurities by adding ammonium sulphate to the partially purified thromboplastin solution in thromboplastin precipitating proportions at an alkaline pH, separating the resulting precipitate of thromboplastin from the solution containing unprecipitated impurities, redissolving the thromboplastin precipitate in saline solution and repeating the precipitation at alkaline pH and separation from unprecipitated impurities a number of times not to exceed about four, and thereafter dialyzing a solution of the purified thromboplastin against physiological saline solution.

4. Process for the preparation of antithrombin-free thromboplastin completely soluble in saline which comprises first removing part of the impurities from an extract containing thromboplastin with magnesium hydroxide, adding a protein-precipitating salt, separating and redissolving the precipitate in physiological saline solution and removing said protein-precipitating salt by dialysis of said solution against a physiological saline solution.

5. Thromboplastin in stable purified form, derived from animal tissue, completely soluble in physiological saline solution, insoluble in concentrated solution of ammonium sulphate, free from antithrombin and antithrombin substances associated with thromboplastin in said animal tissue from which said thromboplastin is derived, and which is an intermediate product useful in the preparation of a stable and highly active antithrombin-free thrombin capable of effective use in clotting blood.

HARRY P. SMITH.